(12) United States Patent
Maruyama et al.

(10) Patent No.: US 9,046,156 B2
(45) Date of Patent: Jun. 2, 2015

(54) HYBRID DRIVE DEVICE

(75) Inventors: Taketoki Maruyama, Toyoake (JP); Tomohiro Sato, Hove (GB)

(73) Assignee: AISIN SEIKI KABUSHIKI KAISHA, Kariya-Shi, Aishi (JP)

( * ) Notice: Subject to any disclaimer, the term of this patent is extended or adjusted under 35 U.S.C. 154(b) by 100 days.

(21) Appl. No.: 13/576,236

(22) PCT Filed: Feb. 23, 2011

(86) PCT No.: PCT/JP2011/053903
§ 371 (c)(1),
(2), (4) Date: Jul. 31, 2012

(87) PCT Pub. No.: WO2011/108408
PCT Pub. Date: Sep. 9, 2011

(65) Prior Publication Data
US 2012/0310461 A1 Dec. 6, 2012

(30) Foreign Application Priority Data
Mar. 2, 2010 (JP) .................................. 2010-045443

(51) Int. Cl.
*B60W 20/00* (2006.01)
*B60K 6/442* (2007.10)
(Continued)

(52) U.S. Cl.
CPC ........... *F16H 3/728* (2013.01); *Y10T 74/19074* (2015.01); *B60K 6/445* (2013.01);
(Continued)

(58) Field of Classification Search
CPC .............................. B60W 10/08; B60W 10/06
USPC ................. 701/22; 180/65.21, 65.22, 65.265; 477/5, 30, 36
See application file for complete search history.

(56) References Cited

U.S. PATENT DOCUMENTS

| 5,931,757 A | 8/1999 | Schmidt |
| 2002/0024306 A1 | 2/2002 | Imai et al. |

(Continued)

FOREIGN PATENT DOCUMENTS

| EP | 1 055 545 A2 | 11/2000 |
| JP | 2000-62483 A | 2/2000 |

(Continued)

OTHER PUBLICATIONS

'International Search Report (PCT/ISA/210) issued on Apr. 12, 2011, by the Japanese Patent Office as the International Searching Authority for International Application No. PCT/JP2011/053903.

(Continued)

*Primary Examiner* — Redhwan k Mawari
*Assistant Examiner* — Rodney P King
(74) *Attorney, Agent, or Firm* — Buchanan Ingersoll & Rooney PC (57) ABSTRACT

A hybrid drive device includes: a gear mechanism that divides and transmits rotary power of an internal-combustion engine to first motor generator and second motor generator; a first shaft to which rotary power of the first motor generator is transmitted; a rotary element; a second shaft to which rotary power of the rotary element is transmitted after deceleration; a third shaft to which rotary power of the second shaft is transmitted after deceleration; a first power-transmission switching mechanism that can switch rotary power of the second motor generator among a state of being transmitted to the rotary element, a state of being transmitted to the third shaft, and a state of not being transmitted; and a second power-transmission switching mechanism that can switch rotary power of the first shaft between a state of transmission to the second shaft and a state of not transmitted.

18 Claims, 7 Drawing Sheets

(51) Int. Cl.

| | | |
|---|---|---|
| *B60W 10/06* | (2006.01) | |
| *B60W 10/08* | (2006.01) | |
| *B60W 10/115* | (2012.01) | |
| *F16H 37/06* | (2006.01) | |
| *F16H 37/08* | (2006.01) | |
| *F16H 3/72* | (2006.01) | |
| *B60K 6/445* | (2007.10) | |
| *B60L 11/12* | (2006.01) | |
| *B60L 11/14* | (2006.01) | |
| *B60L 15/20* | (2006.01) | |

(52) U.S. Cl.
CPC .............. *B60W 10/06* (2013.01); *B60W 10/08* (2013.01); *B60W 10/115* (2013.01); *B60W 20/00* (2013.01); *F16H 2037/0873* (2013.01); *F16H 2200/2005* (2013.01); *F16H 2200/2064* (2013.01); *Y02T 10/6239* (2013.01); *Y02T 10/6286* (2013.01); *Y02T 10/76* (2013.01); *B60L 11/123* (2013.01); *B60L 11/14* (2013.01); *B60L 15/20* (2013.01); *B60L 2210/40* (2013.01); *B60L 2220/14* (2013.01); *B60L 2240/12* (2013.01); *B60L 2240/421* (2013.01); *B60L 2240/441* (2013.01); *B60L 2270/145* (2013.01); *Y02T 10/7077* (2013.01); *Y02T 10/7241* (2013.01); *Y02T 10/6217* (2013.01); *Y02T 10/642* (2013.01); *Y02T 10/70* (2013.01); *Y02T 10/7275* (2013.01)

(56) References Cited

U.S. PATENT DOCUMENTS

| | | |
|---|---|---|
| 2004/0079564 A1 | 4/2004 | Tabata |
| 2004/0251064 A1* | 12/2004 | Imai .......................... 180/65.2 |
| 2004/0251862 A1 | 12/2004 | Imal |

FOREIGN PATENT DOCUMENTS

| | | |
|---|---|---|
| JP | 2005-1564 A | 1/2005 |
| JP | 2005-138692 A | 6/2005 |
| JP | 2006-282069 A | 10/2006 |
| JP | 2007-326422 A | 12/2007 |
| JP | 2009-067091 A | 4/2009 |

OTHER PUBLICATIONS

Written Opinion (PCT/ISA/237) issued on Apr. 12, 2011, by the Japanese Patent Office as the International Searching Authority for International Application No. PCT/JP2011/053903.

First Office Action issued by the People's Republic of China on Aug. 7, 2014 in corresponding Chinese Patent Application No. 201180012190.3, and an English language translation thereof.

\* cited by examiner

HYBRID DRIVE DEVICE

TECHNICAL FIELD

This application claims the benefit of Japanese Patent Application No. 2010-045443, filed on Mar. 2, 2010, the entire disclosure of which is incorporated herein by reference.

The present invention relates to a hybrid drive device that drives wheels by the rotary power of a plurality of power sources via a gear mechanism.

BACKGROUND

There is a conventional hybrid drive device wherein the rotary power of an engine is divided by a power splitting mechanism, transmitted to an axle and a first motor generator or a second motor generator, performs regeneration by one of the motor generators of the first motor generator and second motor generator, and drives the wheels by the other motor generator.

For example, in patent literature 1, an electro-mechanical transmission is disclosed that has: an input member for receiving power from a prime mover power source; an output member for transmitting output power from the transmission; a first and second motor generator; an energy storage unit for mutually exchanging electric power between the first and second motor generator; a control unit for adjusting the mutual exchange of electric power between the energy storage unit and the first and second motor generators, and adjusting the mutual exchange of electric power between the first and second motor generators; and three planetary gear devices (sets) that are coaxially matched; wherein each planetary gear device uses a first and second gear member; each of which engages with a plurality of planetary gears that are installed in a carrier that is assembled in each corresponding planetary gear device; the first and second motor generators are coaxially aligned with each other and with the three planetary gear devices; at least one of the gear members of the first or section planetary gear device is connected with the first motor generator, and at least one of the gear members of the first or second planetary gear device is connected with the second motor generator; there is a means for functionally connecting the carriers that are connected with the first, second and third planetary gear devices with each other and with the output member; of the gear members of the first or second planetary gear device, one gear member that is not connected with the first motor generator is continuously connected with one of the gear members of the third planetary gear device; of the first or second planetary gear device, the gear member that is not connected with the first motor generator is functionally connected with the input member; and the gear member of the third planetary gear device that is not connected with the first or second planetary gear device is selectively connected to ground.

With the electro-mechanical transmission disclosed in patent literature 1, by controlling the rotational speed (rpm) of the first motor generator it is possible to set the engine rpm to an rpm that optimizes the fuel consumption, and when doing that, by having the first motor generator generate electric power, and then driving the second motor generator with that electric power, it is possible for the overall device to obtain necessary and sufficient torque at the output shaft. Reportedly, the electro-mechanical transmission has two operating modes; a first mode that is set in the relatively low-speed state at the start of movement and immediately afterwards, and a second mode that is set in a state when the speed of the vehicle has increased a certain extent. More specifically, in the first mode where a relatively large driving torque is necessary, by fixing the ring gear of the planetary gear mechanism that is on the output shaft side, this planetary gear mechanism is caused to function as a reduction gear train, however, in the second mode where the speed of the vehicle has increased to a certain extent, the sun gear and carrier of that planetary gear mechanism are connected and integrated so that the planetary gear mechanism does not perform an operation for increasing or decreasing the speed.

Patent literature 2 discloses a hybrid drive device in which an internal combustion engine and a first electric motor and second electric motor having a generating function are connected to an output member via a gear mechanism that includes a planetary gear mechanism, wherein there are a pair of planetary gear mechanisms, and each planetary gear mechanism has three rotating elements that mutually perform differential operation; there are at least three engagement devices that switch the path for transmitting power to the output member via these two planetary gear mechanisms; and the power transmission path is set to three different ways in which the mutual relationship between the operating states of the first electric motor and second electric motor for setting the ratio of the rpm of the internal combustion engine and the rpm of the output member to a specified value differs according to the engaged state and released state of the three engagement devices. In this hybrid drive device, the mutual relationship of the operating state of each electric motor when a specified transmission gear ratio is set differs for each power transmission path. Therefore, when mounted in a vehicle, by selecting a suitable power transmission path for low speed, medium speed and high speed, it is possible to operate the internal combustion engine in an efficient state, and power transmission by way of electric power of each electric motor is suppressed, so as a result, power is transmitted efficiently to the output member at any speed range, and thus it is possible to improve fuel consumption.

[Patent Literature 1] Japanese Kokai Publication No. 2000-62483A

[Patent Literature 2] Japanese Kokai Publication No. 2006-282069A

SUMMARY

The entire disclosed contents of patent literatures 1 and 2 are incorporated herein by reference thereto. The following analysis is given by the present invention.

In the electro-mechanical transmission disclosed in patent literature 1, the operating mode is set to the first mode during low vehicle speed, and is set to the second mode during high vehicle speed, and in either mode, one motor generator functions as a generator and the other motor generator receives electricity that is supplied from the one motor generator and functions as a motor. In other words, in addition to an amount of power being transmitted to the output member such as an output shaft from the engine via a gear mechanism, part of the power is converted to electric power, and by driving the motor with this electric power, power is transmitted to the output member via the electrical path. In the power transmission that accompanies this kind of conversion between electric power and mechanical power, unavoidable loss occurs in the process for changing the form of that power. In the electro-mechanical transmission disclosed in patent literature 1, the operating mode is switched according to the vehicle speed, however, the number of modes that can be selected is limited to two, so, for example, in the second mode when the vehicle speed is greatly increased, the ratio of power transmission that accompanies the conversion to electric power increases. Therefore, in the electro-mechanical transmission disclosed in patent literature 1, there is room for improvement from the aspect of power transmission rate or fuel consumption of the entire vehicle. Moreover, in the electro-mechanical transmission disclosed in patent literature 1, there are two motors and three planetary gear trains, so the overall length of the transmission becomes long, and thus there is a problem of decreased mountability in a vehicle.

The hybrid drive device that is disclosed in patent literature 2 is constructed so that power transmission paths of three types or more are set, so there is one more power transmission path than the electro-mechanical transmission disclosed in patent literature 1, and even when the vehicle speed is greatly increased, it is possible to suppress the ratio of the power transmission that accompanies the conversion to electric power. Incidentally, in the hybrid drive device disclosed in patent literature 2, when the operating mode is changed from the low-speed mode to the medium-speed mode (direct-coupling mode), the ring gear of the second planetary gear mechanism is fixed, so it is necessary to lower the rpm of the internal combustion engine and make the rpm of the sun gear of the first planetary gear mechanism 0, and there is a problem in that the shift changing takes time. Moreover, in the hybrid drive device disclosed in patent literature 2, the medium-speed mode is a direct-coupling mode, so each of the elements of the planetary gear mechanism are collinear, and even though it is necessary to arrange the elements in a horizontal row, in the low-speed mode, there is always an inclination angle in the collinear graphing, so it is possible that there will be a large shock when shift changing is performed.

It is an object of the present invention to provide a hybrid drive device that is able to improve mountability in a vehicle, as well as improve speed (or shift)-change performance, while at the same time improve power transmission efficiency and fuel consumption.

A hybrid drive device according to a first aspect of the present invention comprises: a gear mechanism that divides and transmits rotary power from an internal combustion engine to a first motor generator and second motor generator; a first shaft to which a rotary power from the first motor generator is transmitted; a rotating element; a second shaft to which a rotary power from the rotating element is transmitted; a third shaft to which a rotary power from the second shaft is transmitted, and which drives wheels; a first power transmission switching mechanism that can switch among a state wherein the rotary power from the second motor generator is transmitted to the rotating element, a state wherein transmission to the third shaft is allowed, and a state wherein transmission to the rotating element and to the third shaft is not allowed; and a second power transmission switching mechanism that can switch between a state wherein transmission of the rotary power from the first shaft to the second shaft is allowed, and a state wherein transmission to the second shaft is not allowed.

In the hybrid drive device of the present invention, preferably the gear mechanism comprises: a sun gear to which the rotary power from the internal combustion engine is inputted; a pinion gear(s) that engages with a sun gear; a ring gear that engages with the pinion gear(s) and outputs rotary power toward the second motor generator; and a carrier that, rotatably supporting the pinion gear(s) and outputting rotary power toward the first motor generator.

Preferably, the hybrid drive device of the present invention further comprises an electronic control device that controls operations of the internal combustion engine, the first motor generator, the second motor generator, the first power transmission switching mechanism and second power transmission switching mechanism.

In the hybrid drive device of the present invention, preferably the electronic control device:
in the first mode, controls the first motor generator so that regeneration by the first motor generator is allowed, controls the second motor generator so that driving by the second motor generator is allowed, controls the first transmission switching mechanism so that transmission of rotary power from the first shaft to the second shaft is not allowed, and controls the second power transmission switching mechanism so that transmission of rotary power from the second motor generator to the rotating element is allowed; in the second mode that is used when vehicle speed is faster than in the first mode, controls the first motor generator so that driving by the first motor generator is allowed, controls the second motor generator so that regeneration by the second motor generator is allowed, controls the first power transmission switching mechanism so that transmission of rotary power from the first shaft to the second shaft is allowed, and controls the second power transmission switching mechanism so that transmission of rotary power from the second motor generator to the rotating elements and the third shaft is not allowed; and
in the third mode that is used when the vehicle speed is faster than in the second mode, controls the first motor generator so that regeneration by the first motor generator is allowed, controls the second motor generator so that driving by the second motor generator is allowed, controls the first power transmission switching mechanism so that the transmission of rotary power from the first shaft to the second shaft is not allowed, and controls that second power transmission switching mechanism so that transmission of rotary power from the second motor generator to the third shaft is allowed.

Preferably, in the hybrid drive device of the present invention, the electronic control device switches the mode among the first mode, second mode and third mode based on a rotational speed (rpm) of the internal combustion engine and that of the third shaft.

In the hybrid drive device of the present invention, preferably the electronic control device, based on the rpm of the internal combustion engine and the rpm of the third shaft, performs mode switching from the first mode to the second mode when, during acceleration, the rpm of the first shaft matches that of the second shaft; and performs mode switching from the second mode to the third mode when, during acceleration, the rpm of the second motor generator matches that of the third shaft.

Preferably, in the hybrid drive device of the present invention, the hybrid drive device is used in a vehicle; the vehicle operates at a first speed, a second speed that is faster than the first speed, and a third speed that is faster than the second speed; and the electronic control device has a first mode that is used when the vehicle is operation at the first speed, and in this first mode, controls the first motor generator so that regeneration by the first motor generator is allowed, controls the second motor generator so that driving by the second motor generator is allowed, controls the first power transmission switching mechanism so that transmission of rotary power from the first shaft to the second shaft is not allowed, and controls the second power transmission switching mechanism so that transmission of rotary power from the second motor generator to the rotating element is allowed.

Preferably, in the hybrid drive device of the present invention, the hybrid drive device is used in a vehicle; the vehicle operates at a first speed, a second speed that is faster than the first speed, and a third speed that is faster than the second speed; and the electronic control device has a second mode that is used when the vehicle is in operation at the second speed, and in this second mode, controls the first motor generator so that driving by the first motor generator is allowed, controls the second motor generator so that regeneration by the second motor generator is allowed, controls the first power transmission switching mechanism so that transmission of rotary power from the first shaft to the second shaft is allowed, and controls the second power transmission switching mechanism so that transmission of a rotary power from the second motor generator to the rotating elements and third shaft is not allowed.

In the hybrid drive device of the present invention, preferably the hybrid drive device is used in a vehicle; the vehicle operates at a first speed, a second speed that is faster than the first speed, and a third speed that is faster than the second speed; and the electronic control device has a third mode that is used when the vehicle is in operation at the third speed, and in this third mode, controls the first motor generator so that regeneration by the first motor generator is allowed, controls the second motor generator so that driving by the second motor generator is allowed, controls the first power transmission switching mechanism so that transmission of rotary power from the first shaft to the second shaft is not allowed, and controls the second power transmission switching mechanism so that transmission of rotary power from the second motor generator to the third shaft is allowed.

According to the present invention, it is possible to expand the range of the reduction ratio without entering the so-called power circulation state occurring wherein the first motor generator operates in a reversed rotary power state, and the second motor generator operates in a forced regeneration state, so it is possible for the internal combustion engine to operate in an optimum fuel consumption state, and thus it is possible to improve the power transmission efficiency and fuel consumption. Moreover, in the hybrid drive device, there is only one planetary gear mechanism, so the overall length of the transmission becomes short, and thus it is possible to improve mountability in vehicle. Furthermore, in the acceleration process of a vehicle, it is possible to smoothly switch modes without lowering the rpm of the internal combustion engine, so shift-changing (shift changing) does not take time, and it is possible to perform shift-changing during acceleration of the internal combustion engine without shifting shock occurring.

MODES

A hybrid drive device according to an exemplary embodiment of the present invention comprises: a gear mechanism (10 in FIG. 1) that distributes and transmits rotary power of an internal combustion engine (1 in FIG. 1) to a first motor generator (3 in FIG. 1) and a second motor generator (4 in FIG. 1); a first shaft (25 in FIG. 1) to which a rotary power from the first motor generator (4 in FIG. 1) is transmitted; a rotating element (20 in FIG. 1); a second shaft (30 in FIG. 1) to which a rotary power from the rotating element is transmitted; a third shaft (22 in FIG. 1) to which a rotary power from the second shaft is transmitted, and which drives the wheels (36, 37 in FIG. 1); a first power transmission switching mechanism (16 in FIG. 1) that is able to switch among a state that allows transmission of rotary power from the second motor generator to the rotating element, a state that allows transmission to the third shaft, and a state that prohibits transmission to the rotating element and third shaft; and a second power transmission switching mechanism (26 in FIG. 1) that is able to switch between a state that allows the transmission of rotary power from the first shaft to the second shaft, and a state that prohibits transmission to the second shaft.

In assigning reference numbers to the drawings in this specification, the reference numbers are mentioned solely as an aid to help understand the explanation, and are not intended to limit the invention to the modes illustrated in the drawings.

Example 1

Figure 1:
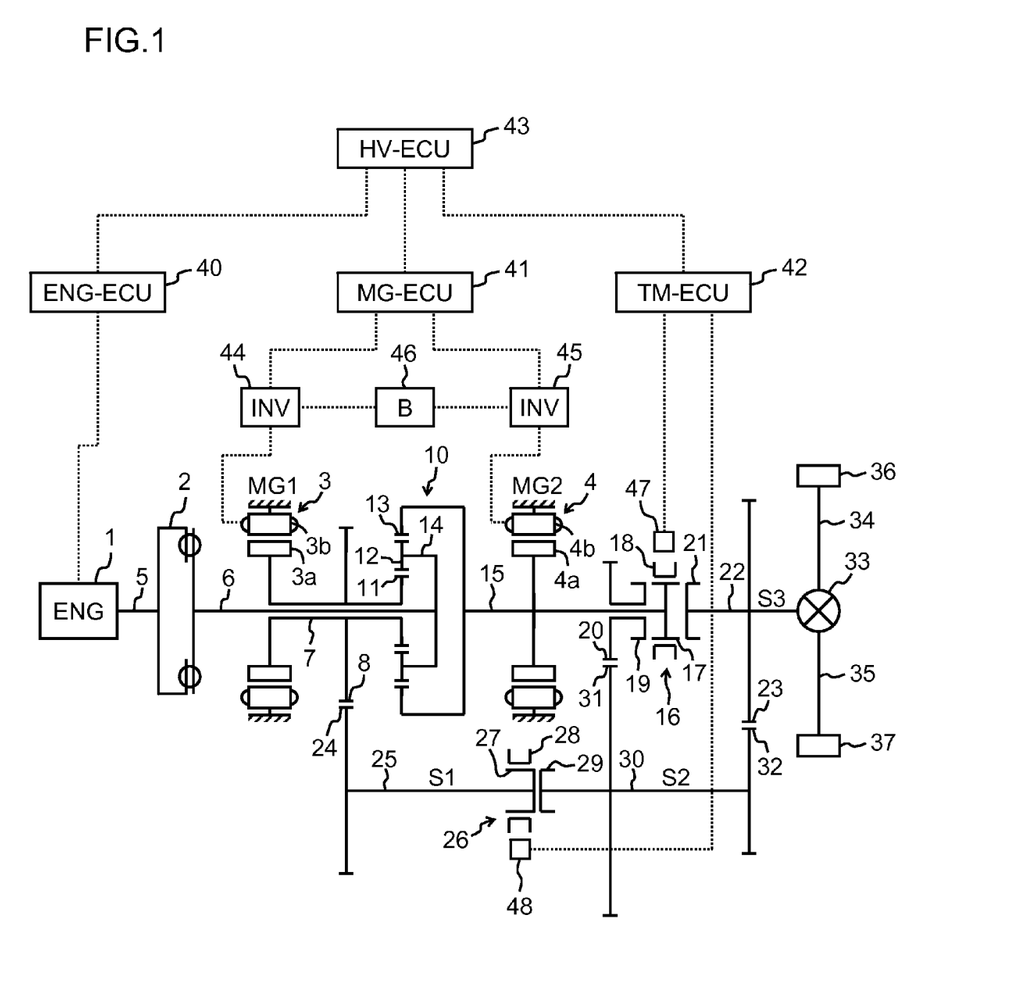
FIG. 1 is a skeleton diagram schematically illustrating the construction of a hybrid drive device of Example 1 of the present invention.

The hybrid drive device of Example 1 of the present invention will be explained with reference to the drawings. FIG. 1 is a skeleton diagram that schematically illustrates the construction of the hybrid drive device of this example 1 of the present invention.

The hybrid drive device is a device that divides rotary power of an engine 1 by a planetary gear mechanism 10 and transmits the rotary power to an axle and a first motor generator 3 or second motor generator 4, as well as performs regeneration by one of the first motor generator 3 and second motor generator 4, and drives wheels 36, 37 by the other motor generator. The hybrid drive device comprises: an engine 1, a torque transmission device 2, a first motor/generator 3 (MG1), a second motor generator 4 (MG2), a crankshaft 5, a shaft 6, a shaft 7, a drive gear 8, a planetary gear mechanism 10, a shaft 15, a synchronizer 16, a drive gear 20, a shaft 22 (S3), a follower gear 23, a follower gear 24, a shaft 25 (S1), a synchronizer 26, a shaft 30 (S2), a follower gear 31, a drive gear 32, a differential apparatus 33, shafts 34, 35, wheels 36, 37, an engine control device 40, a motor generator control device 41, a transmission control device 42, a hybrid control device 43, inverters 44, 45, an electrical storage device (battery) 46, and actuators 47, 48.

Engine 1 is an internal combustion engine that combusts and burns fuel inside a cylinder, and then using that thermal energy, outputs rotary power, and has an injector actuator (not illustrated in the figure) that adjusts the amount of fuel to be injected, and an igniter actuator that adjusts the ignition timing for igniting the fuel. The rotary power of the engine 1 is transmitted to the torque transmission device 2 by way of the crankshaft 5. The engine 1 is connected to the engine control device 40 so that communication is possible, and is controlled by the engine control device 40.

The torque transmission device 2 is a device that makes it possible to disconnectably transmit rotary power from the crankshaft 5 to the shaft 6. A torque converter, a clutch, a fluid coupling, and the like can be used as the torque transmission device 2. The rotary power from the torque transmission device 2 is transmitted to a carrier 14 of the planetary gear mechanism 10 via a shaft 6.

The first motor generator 3 (MG1) is a synchronous generator motor that together with being able to function as an electric generator, is able to function as an electric motor. The first motor generator 3 comprises a stator 3b that is fastened to the transmission housing (not illustrated in the figure), and a rotor 3a that rotates inside the stator 3b. A coil is wound around the stator 3b, and that coil is electrically connected to an electric storage device by way of an inverter 44. The rotor 3a is linked to a shaft 7 and rotates in unison with a sun gear 11 of the planetary gear mechanism 10 and drive gear 8 by way of the shaft 7. The first motor generator 3 is controlled by the motor generator control device 41 via the inverter 44.

The second motor generator 4 (MG2) is a synchronous generator motor that, together with being able to function as an electric generator, is able to function as an electric motor. The second motor generator 4 comprises a stator 4b that is fastened to the transmission housing (not illustrated in the figure), and a rotor 4a that rotates inside the stator 4b. A coil is wound around the stator 4b, and that coil is electrically connected to an electric storage device via an inverter 45. The rotor 4a is linked to the shaft 15 and rotates in unison with the ring gear 13 of the planetary gear mechanism 10 and drive gear 17 of the synchronizer 1.6 by way of the shaft 15. The second motor generator 4 is controlled by the motor generator control device 41 via the inverter 45.

The shaft 7 is a rotating shaft that integrally rotates together with the rotor 3a of the first motor generator 3, the sun gear 11 of the planetary gear mechanism 10 and the drive gear 8. The rotational speed (rpm) of the shaft 7 corresponds to that of the first motor generator 3 (MG1). The drive gear 8 has a specified gear ratio (for example, 1:1) relative to, and engages with the follower gear 24. When the gear ratio of the drive gear 8 and the follower gear 24 is 1:1 and the shaft 7 rotates one turn in a forward direction, the shaft 25 (S1) rotates one turn in a reverse direction.

The planetary gear mechanism 10 is a power dividing mechanism that divides the rotary power from the engine 1 and transmits that rotary power to the first motor generator 3 or second motor generator 4. The planetary gear mechanism 10 comprises a sun gear 11, a pinion gear 12, a ring gear 13 and a carrier 14. The sun gear 11 engages with the pinion gear 12, and by way of the shaft 7, integrally rotates with the rotor 3a of the first motor generator 3 and the drive gear 8. The pinion gear 12 engages with the sun gear 11 and the ring gear 13, and is rotatably supported by the carrier 14. The ring gear 13 engages with the pinion gear 12, and by way of the shaft 15, integrally rotates with the rotor 4a of the second motor generator 4 and the drive gear 17 of the synchronizer 16. The carrier 14 rotatably supports the pinion gear 12, and rotates by rotation of the pinion gears 12 revolving around the outside of the sun gear 11. The rotary power from the engine 1 is transmitted to the carrier 14 by way of the crankshaft 5, the torque transmission device 2, and shaft 6. In the planetary gear mechanism 10, the rotation ratio of the sun gear 11 and the ring gear 13 when the carrier is fixed is 1:λ (where 0<λ<1).

The shaft 15 is a rotating shaft that integrally rotates with the ring gear 13 of the planetary gear mechanism 10, the rotor 4a of the second motor generator, and the drive gear 17 of the synchronizer 16. The rpm of the shaft 15 corresponds to that of the second motor generator 4 (MG2).

The synchronizer 16 is a device that synchronizes the rpm of the shaft 15 and the drive gear 20 or the shaft 22, and can selectively transmit the rotary power of the shaft 15 to the drive gear 20 or shaft 22. The synchronizer 16 comprises a drive gear 17, a sleeve 18, a follower gear 19, and a follower gear 21. The drive gear 17 integrally rotates with the ring gear 13 of the planetary gear mechanism 10 and the rotor 4a of the second motor generator 4 by way of the shaft 15. The sleeve 18 is a cylindrical member that selectively connects the drive gear 17 and follower gear 19 or follower gear 21, and by receiving the operation of the actuator 47, slides in the axial direction. The sleeve 18 has a gear formed around its inner circumferential surface, and in the neutral state engages only with the drive gear 17; however by sliding to the follower gear 19 side, engages with the drive gear 17 and the follower gear 19, and by sliding to the follower gear 21 side, engages with the drive gear 17 and follower gear 21. The follower gear 19 integrally rotates with the drive gear 20. The follower gear 21 integrally rotates with the follower gear 23 by way of the shaft 22.

The drive gear 20 is a gear to which the rotary power of the shaft 15 is transmitted when in the synchronizer 16 the drive gear 17 and follower gear 19 are coupled by way of the sleeve 18. The follower gear 20 engages with the follower gear 31 with a specified gear ratio (for example, 1:3). When the gear ratio between the drive gear 20 and the follower gear 31 is 1:3 and the drive gear 20 rotates three turns in the forward direction, the shaft 30 (S2) rotates one turn in the reverse direction.

The shaft 22 (S3) is a rotating shaft that integrally rotates with the follower gear 21 and follower gear 23 of the synchronizer 16. The rotary power of the shaft 22 is transmitted to the wheels 36, 37 by way of the differential apparatus 33 and shafts 34, 35 so that differential motion is possible. The rotary power of the shaft 15 is transmitted to the shaft 22 when in the synchronizer 16 the drive gear 17 and follower gear 21 are connected by way of the sleeve 18. The follower gear engages with the drive gear 32 with a specified gear ratio (for example, 2:1). When the gear ratio between the follower gear 23 and the drive gear 32 is 2:1 and the shaft 30 (S2) rotates two turns in the forward direction, the shaft 22 (S3) rotates one turn in the reverse direction.

The shaft 25 (S1) is a rotating shaft that integrally rotates with the follower gear 24 and drive gear 27 of the synchronizer 26. The follower gear 24 engages with the drive gear 8 with a specified gear ratio (for example, 1:1).

The synchronizer 26 is a device that synchronizes the rpm of the shaft 25 (S1) and shaft 30 (S2), and can disconnectably transmit the rotary power of the shaft 15 to the shaft 30 (S2). The synchronizer 26 comprises a drive gear 27, a sleeve 28 and a follower gear 29. The drive gear 27 integrally rotates with the follower gear 24 by way of the shaft 25. The sleeve 28 is a cylindrical member that disconnectably connects the drive gear 27 and the follower gear 29, and by receiving the operation of the actuator 48, slides in the axial direction. A gear is formed around the inner circumferential surface of the sleeve 28, and in the neutral state engages only with the drive gear 27; however by sliding to the follower gear 29 side, engages with the drive gear 27 and the follower gear 29. The follower gear 29 integrally rotates with the follower gear 31 and follower gear 32 by way of the shaft 30 (S2). In FIG. 1, the synchronizer 26 is used as a means of disconnectably transmitting power between the shaft 25 (S1) and the shaft 30(S2), however, instead of the synchronizer 26, it is possible to use a clutch device.

The shaft 30 (S2) is a rotating shaft that integrally rotates with the follower gear 29, the follower gear 31 and the drive gear 32 of the synchronizer 32. The follower gear 31 engages with the drive gear 20 with a specified gear ratio (for example, 3:1). The drive gear 32 engages with the follower gear 23 with a specified gear ratio (for example, 1:2).

The engine control device 40 is a computer (electronic control device) that controls the operation of the engine 1. The engine control device 40 is connected so as to be able to perform communication with the various actuators (for example, an indicator actuator, igniter actuator, and the like (not illustrated in the figure)) and various sensors (for example, the acceleration start sensor, shifting position sensor, rotation sensor, and the like (not illustrated in the figure)) installed inside the engine 1, and with the hybrid control device 43. The engine control device 40 performs control according to control signals from the hybrid control device 43 and based on a specified program (including a database, map and the like).

The motor generator control device 41 is a computer (electronic control device) that controls the operation of the motor generators 3, 4 by way of the inverters 44, 45. The motor generator control device 41 is connected so as to be able to perform communication with the inverters 44, 45, the various sensors (for example, rotation sensor, and the like (not illustrated in the figure)) and the hybrid control device 43. The motor generator control device 41 performs control according to control signals from the hybrid control device 43 and based on specified programs (including a database, map and the like).

The transmission control device 42 is a computer (electronic control device) that controls the operation of the synchronizers 16, 26 by way of the actuators 47, 48. The transmission control device 42 is connected so as to be able to perform communication with the actuators 47, 48, various sensors (for example, the rotation sensor and the like (not illustrated in the figure)), and the hybrid control device 43. The transmission control device 42 performs control processing according to control signals from the hybrid control device 43 and based on specified programs (including a database, map and the like).

The hybrid control device 43 is a computer (electronic control device) that controls the operation of the engine control device 40, motor generator control device 41 and transmission control device 42. The hybrid control device 43 is connected so as to be able to perform communication with the various sensors (for example, the rotation sensor, and the like (not illustrated in the figure)), the engine control device 40, motor generator control device 41 and transmission control device 42. The hybrid control device 43 outputs control signals to the engine control device 40; motor generator control device 41 and transmission control device 42 according to a specified state of the hybrid control device, and based on specified programs (including a database, map and the like).

The inverters 44, 45 control the operation (drive operation, regeneration operation) of the motor generators 3, 4 according to a control signal from the motor generator control device 41. The electrical storage device 46 is a device that stores (accumulates) electric power; for example, a secondary battery, or a capacitor which can be charged and discharged with electric power can be used. The electrical storage device 46 is electrically connected to the motor generators 3, 4 by way of the inverters 44, 45.

The actuator 47 is a device that causes the sleeve 18 of the synchronizer 16 to slide by way of a fork member (not illustrated in the figure) according to a control signal from the transmission control device 42. The actuator 48 is a device that, causes the sleeve 28 of the synchronizer 26 to slide by way of a fork member (not illustrated in the figure) according to a control signal from the transmission control device 42.

Figure 2:
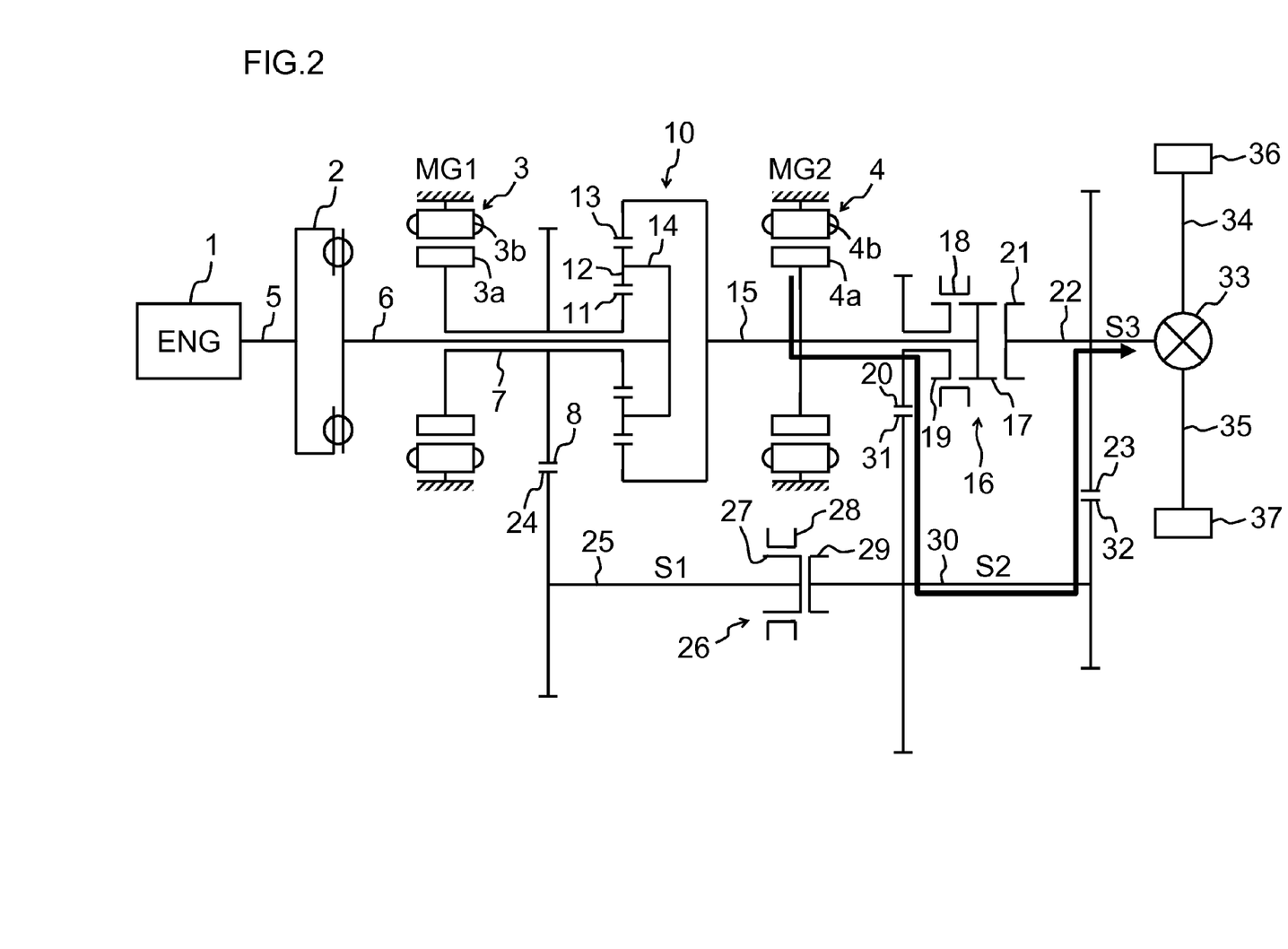
FIG. 2 is a schematic diagram illustrating a power transmission path at a first mode (low-speed mode) in the hybrid drive device of Example 1 of the present invention.
Figure 3:
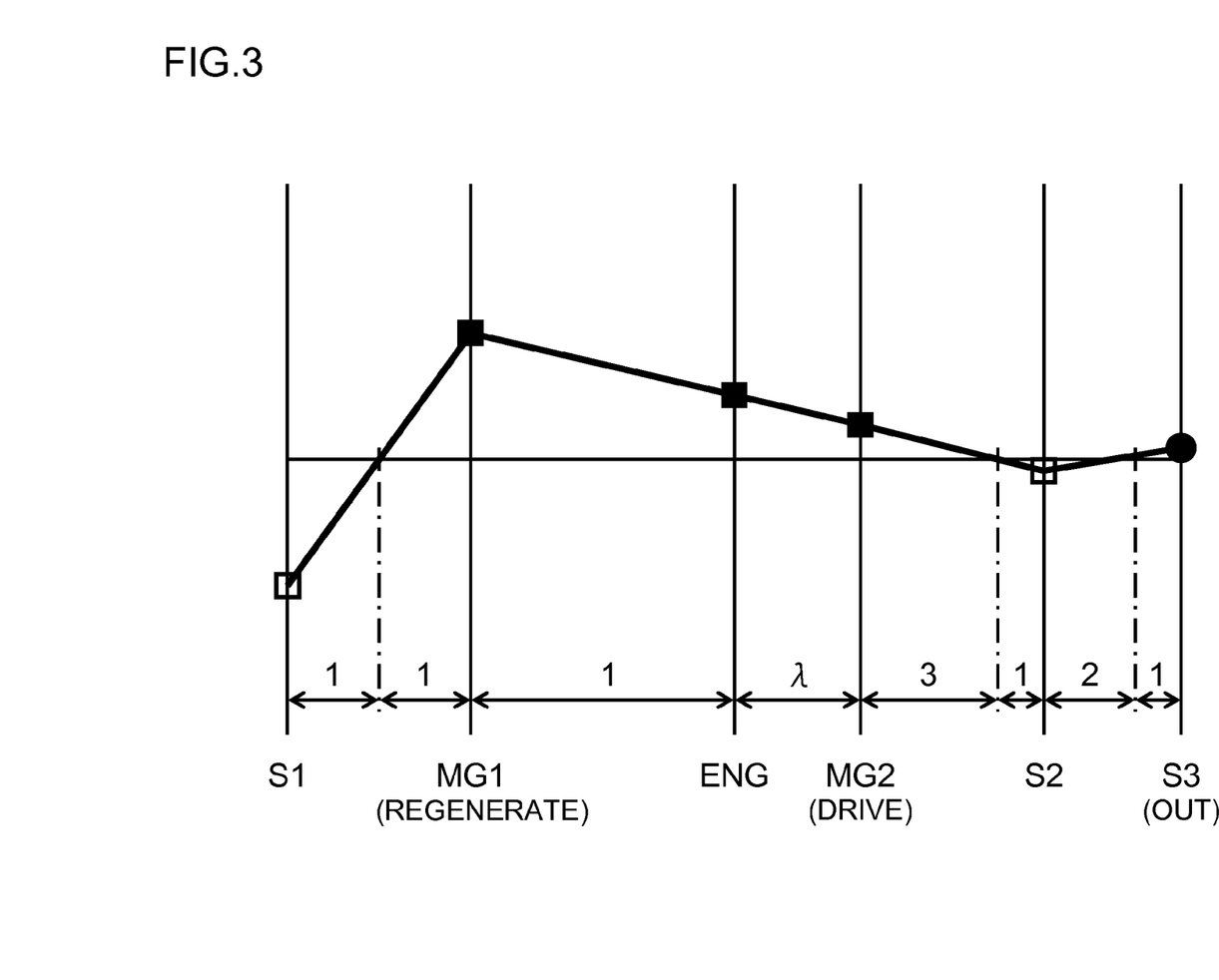
FIG. 3 is a collinear graph related to the rpm indicating the operating state of the first mode (low-speed mode) of the hybrid drive device of Example 1 of the present invention.
Figure 4:
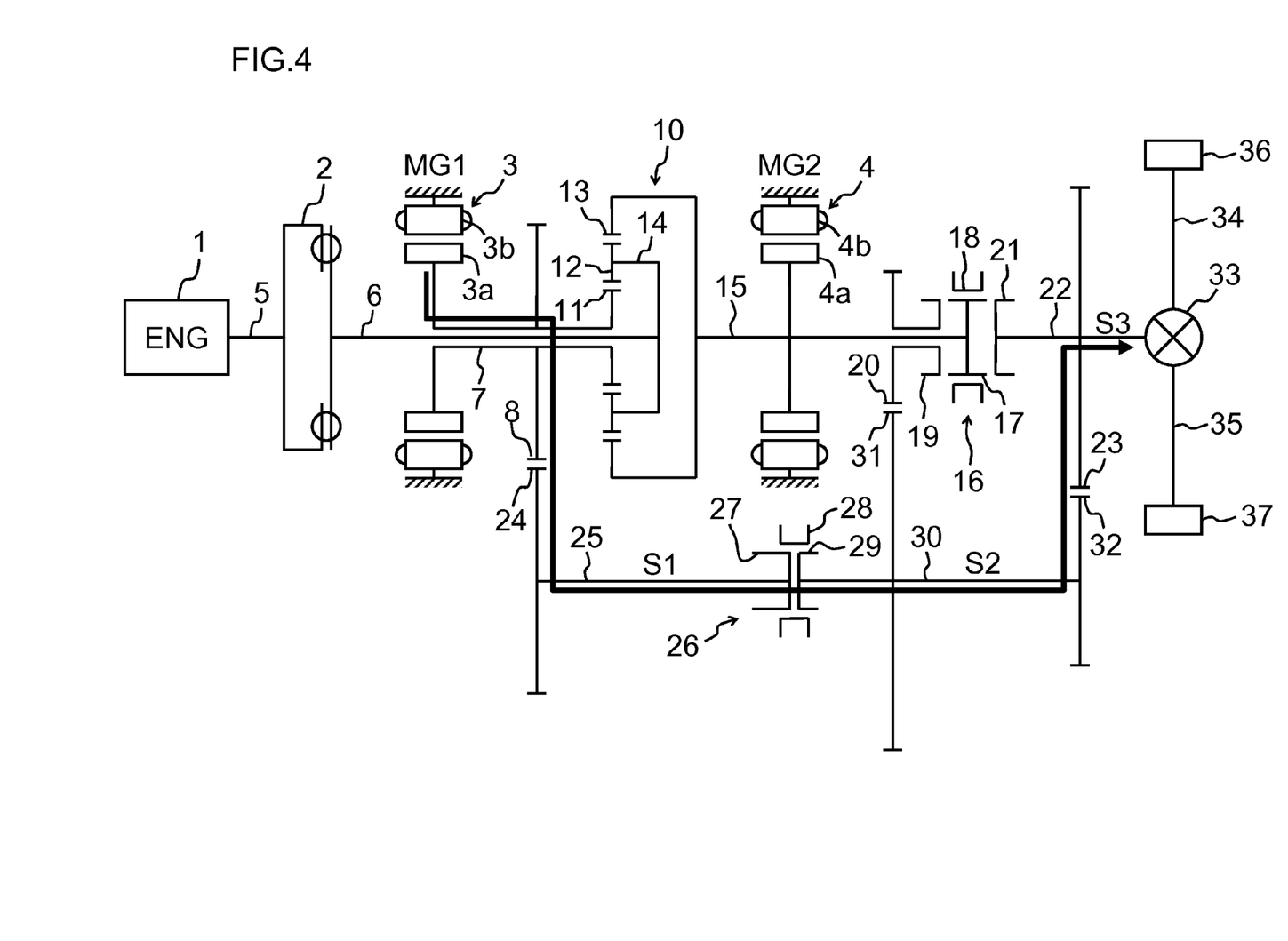
FIG. 4 is a schematic diagram illustrating a power transmission path at a second mode (intermediate-speed mode) in the hybrid drive device of Example 1 of the present invention.
Figure 5:
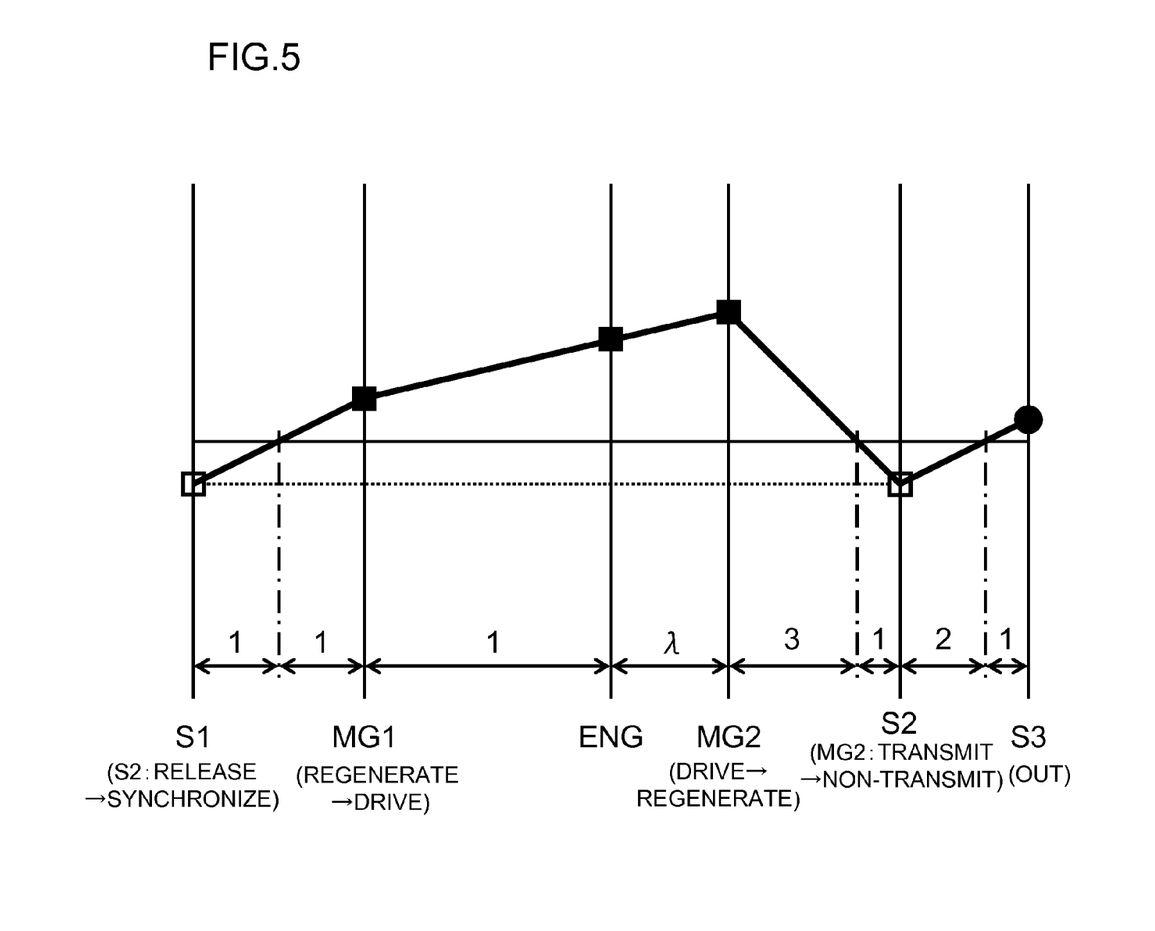
FIG. 5 is a collinear graph related to the rpm indicating the operating state when changing from the first mode to the second mode of the hybrid drive device of Example 1 of the present invention.
Figure 6:
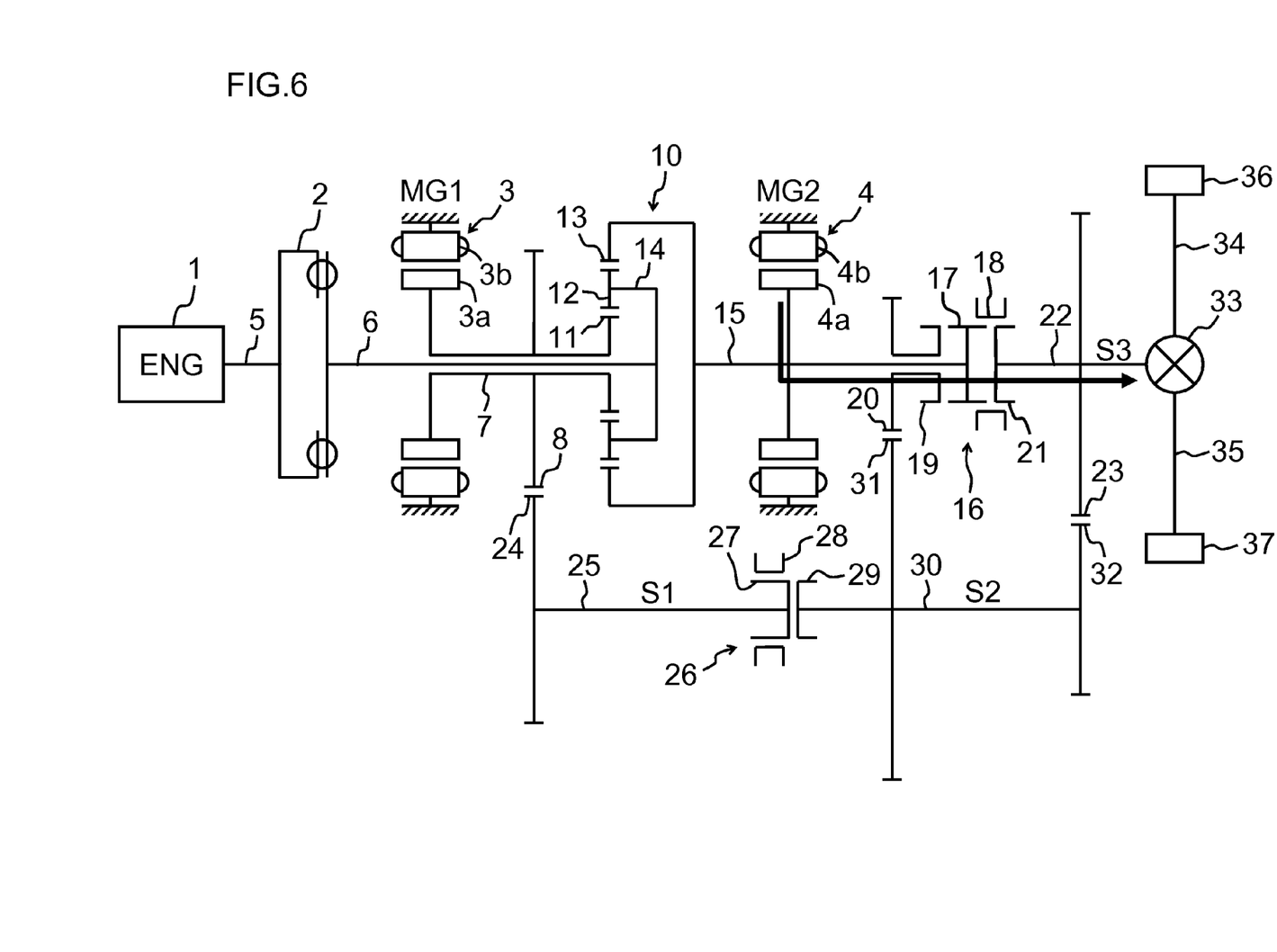
FIG. 6 is a schematic diagram illustrating a power transmission path at a third mode (high-speed mode) in the hybrid drive device of Example 1 of the present invention.
Figure 7:
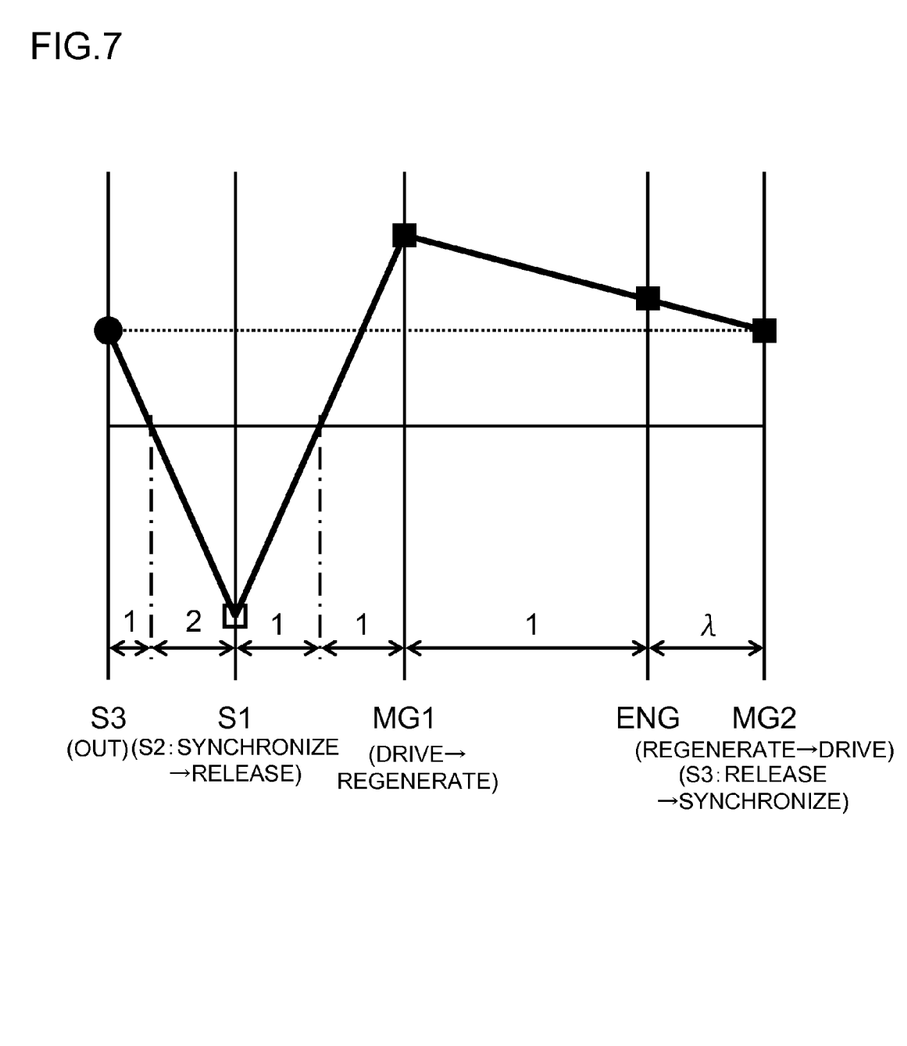
FIG. 7 is a collinear graph related to the rpm indicating the operating state when changing from the second mode to the third mode of the hybrid drive device of Example 1 of the present invention.

Next, the operation of the hybrid drive device of Example 1 of the present invention will be explained using the drawings. FIG. 2 is a schematic diagram illustrated in the power transmission path in the first mode (low-speed mode) of the hybrid drive device of this example of the present invention. FIG. 3 is a collinear graph related to the rpm that indicates the operating state of the first mode (low-speed mode) of the hybrid drive device of this example of the present invention. FIG. 4 is a schematic diagram illustrating the power transmission path in the second mode (intermediate speed mode) of the hybrid drive device of this example of the present invention. FIG. 5 is related to the rpm indicating the operating state when changing from the first mode to the second mode of the hybrid drive device of this example of the present invention. FIG. 6 is a schematic diagram illustrating the power transmission path of a third mode (high-speed mode) of the hybrid drive device of Example 1 of the present invention. FIG. 7 is a collinear graph related to the rpm indicating the operating state when changing from the second mode to the third mode of the hybrid drive device of this example of the present invention.

In the hybrid drive device, as output modes there is a first mode (see FIG. 2) in which rotary power from the second motor generator 4 (MG2) is transmitted to the shaft 22 (S3) via the shaft 30 (S2), a second mode (see FIG. 4) in which rotary power from the first motor generator 3 (MG1) is transmitted to the shaft 22 (S3) via the shaft 25 (S1) and the shaft 30 (S2), and a third mode (see FIG. 6) in which rotary power from the second motor generator 4 (MG2) is directly transmitted to the shaft 22 (S3).

Here, in the first mode (see FIG. 2), regeneration is performed by the first motor generator 3 (MG1), driving is performed by the second motor generator 4 (MG2), the shaft 15 and the drive gear 20 are linked (coupled) in the synchronizer 16, and the shaft 25 (S1) and the shaft 30 (S2) are released (disconnected) in the synchronizer 26. Therefore, the rotary power from the second motor generator 4 (MG2) is transmitted to the drive gear 20 via the shaft 15 and the synchronizer 16, the speed is reduced (here, the reduction ratio is 1/3) between the drive gear 20 and the follower gear 31, and the power is transmitted to the shaft 30 (S2), the speed is reduced (here, the reduction ratio is 1/2) between the drive gear 32 and the follower gear 23, and the power is transmitted to the shaft 22 (S3), and then the power is transmitted to the wheels 36, 37 via the differential apparatus 33 and the shafts 34, 35. The rpm of the shaft 22 (S3) is 1/6 the rpm of the second motor generator 4 (MG2).

In the second mode (see FIG. 4), the first motor generator 3 (MG1) performs driving and the second motor generator 4 (MG2) performs regeneration, in the synchronizer 16, the shaft 15 is released (disconnected) from the drive gear 20 and the shaft 22 (S3), and in the synchronizer 26, the shaft 25 (S1) and shaft 30 (S2) are connected. Therefore, the rotary power from the first motor generator 3 (MG1) is transmitted from the shaft 7 to the shaft 25 (S1) without the speed being reduced between the drive gear 8 and follower gear 24 (here the reduction ratio is 1/1), is transmitted to the shaft 30 (S2) via the synchronizer 26, is transmitted to the shaft 22 (S3) with the speed being reduced between the drive gear 32 and the follower gear 23 (here the reduction ratio is 1/2), and is transmitted to the wheels 36, 37 via the differential apparatus 33 and the shafts 34 and 35. The rotational speed (rpm) of the shaft 22 (S3) is 1/2 of the rpm of the first motor generator 3 (MG1).

In the third mode (see FIG. 6), the first motor generator 3 (MG1) performs regeneration and the second motor generator 4 (MG2) performs driving, in synchronizer 16 the shaft 15 and the shaft 22 (S3) are linked (connected), and in synchronizer 26 the shaft 25 (S1) and the shaft 30 (S2) are released (disconnected). Therefore, the rotary power of the second motor generator 4 (MG2) is transmitted to the shaft 22 (S3) via the shaft 7 and synchronizer 16 without being reduced, and is transmitted to the wheels 36, 37 via the differential apparatus 33 and shafts 34, 35. The rpm of the shaft 22 (S3) is the same as the rpm of the second motor generator 4 (MG2).

Therefore, during low speed when a comparatively large amount of drive torque is required, the first mode (see FIG. 2; reduction ratio 1/6), which is the mode among the three output modes having a large reduction ratio, is selected and used; during high speed when acceleration is required, the third mode (see FIG. 6, reduction ratio 1/1), which is the mode among the three output modes having the lowest reduction ratio, is selected and used, and during intermediate speed, which is in between these, the second mode (see FIG. 4; reduction ratio 1/2), which is the mode among the three output modes that has an intermediate reduction ratio, is selected and used. In each mode, continuous speed variation is performed, however, in the first mode (see FIG. 2), during initial operation, the engine 1 is in a state of accelerating, and it is easier for the rpm of the first motor generator 3 (MG1) to rise than the rpm of the second motor generator 4 (MG2) (see FIG. 3), so by the first motor generator 3 (MG1) performing regeneration, and the second motor generator performing driving, it is possible to efficiently cause the vehicle to accelerate. When accelerating in the first mode (see FIG. 2), the rpm of the second motor generator 4 (MG2) becomes greater than the rpm of the first motor generator 3 (MG1), and the rpm of the shaft 25 (S1) reaches the point where it coincides with the rpm of the shaft 30 (S2) (see FIG. 5). When that happens, in order to switch from the first mode (see FIG. 2) to the second mode (see FIG. 4), the first motor generator 3 (MG1) is switched from regeneration to driving, the second motor generator 4 (MG2) is switched from driving to regeneration, the synchronizer 16 is switched from a state in which the shaft 15 and drive gear 20 are linked to a state in which the shaft 15 and the drive gear 20 and shaft 22 (S3) are released, and the synchronizer 26 is switched from a state in which the shaft 25 (S1) and shaft 30 (S2) are released, to a state in which they are connected. This kind of switching is performed by electronic control devices (40 to 43 in FIG. 1), and by monitoring the rpm of both the engine 1 and the shaft 22 (S3), it is possible to detect the point at which the mode is to be switched from the first mode (see FIG. 2) to the second mode (see FIG. 4).

In the second mode (see FIG. 4), immediately after switching from the first mode (see FIG. 2) to the second mode (see FIG. 4), the engine is in a state of accelerating and the rpm of the first motor generator 3 (MG1) is lower than the rpm of the second motor generator 4 (MG2) (see FIG. 5), so by the first motor generator 3 (MG1) performing driving, and the second motor generator 4 (MG2) performing regeneration, it is possible for the vehicle to accelerate efficiently. In the second mode (see FIG. 4), when the vehicle accelerates, the rpm of the first motor generator 3 (MG1) becomes greater than the rpm of the second motor generator 4 (MG2), and the rpm of the second motor generator 4 (MG2) reaches the point where it coincides with the rpm of the shaft 30 (S2) (see FIG. 7). When that happens, in order to switch from the second mode (see FIG. 4) to the third mode (see FIG. 6), the first motor generator 3 (MG1) is switched from driving to regeneration, the second motor generator 4 (MG2) is switched from regeneration to driving, the synchronizer 16 is switched from a state in which the shaft 15 and the drive gear 20 and shaft 22 (S3) are released to a state in which the shaft 15 and shaft 22 (S3) are connected, and the synchronizer 26 is switched from a state in which the shaft 25 (S1) and shaft 30 (S2) are connected to a state in which they are released. This kind of switching is performed by electronic control devices (40 to 43 in FIG. 1), and by monitoring the rpm of both the engine 1 and the shaft 22 (S3), it is possible to detect the point at which the mode is to be switched from the second mode (see FIG. 4) to the third mode (see FIG. 6).

In the third mode (see FIG. 6), immediately after the mode has been switched from the second mode (se FIG. 4) to the third mode (see FIG. 6), the engine 1 is in the accelerating state, and the rpm of the second motor generator 4 (MG2) is less than the rpm of the first motor generator 3 (MG1) (see FIG. 7), so by the first motor generator 3 (MG1) performing regeneration, and the second motor generator 4 (MG2) performing driving, it is possible to efficiently cause the vehicle to accelerate.

With this examples, it is possible to expand the range of the reduction ratio without the so-called power circulation state occurring wherein the first motor generator 3 (MG1) operates in a reversed rotary power state, and the second motor generator operates in a forced regeneration state, so it is possible for the internal combustion engine to operate in an optimum fuel consumption state, and thus it is possible to improve the power transmission efficiency and fuel consumption. Moreover, in a hybrid drive device, there is only one planetary gear mechanism, so the overall length of the transmission becomes short, and thus it is possible to improve mountability in vehicle. Furthermore, in the acceleration process of a vehicle, it is possible to smoothly switch modes without lowering the rpm of the engine 1, so shift changing does not take time, and it is possible to perform shift change during acceleration of the engine 1 without transmission shock occurring.

The exemplary embodiments or examples of the invention can be modified or changed within the framework of the entire disclosure of the present invention (including the claims and drawings), and based on the basic technical scope of the invention. Various combinations or selections of the various elements of the invention are possible within the scope of the claims of the invention. That is, the present invention also includes various changes and modifications that can be obtained by one skilled in the art according to the entire disclosure including the claims, and that are within the technical scope of the invention.

EXPLANATION OF REFERENCE NUMBERS

1 Engine (ENG, internal combustion engine)
2 Torque transmission device
3 First motor generator (MG1)
3a Rotor
3b Stator
4 Second motor generator (MG2)
4a Rotor
4b Stator
5 Crankshaft
6, 7 Shaft
8 Drive gear
10 Planetary gear mechanism (gear mechanism)
11 Sun gear
12 Pinion gear
13 Ring gear
14 Carrier
15 Shaft 16 Synchronizer (first power transmission switching mechanism9
17 Drive gear
18 Sleeve
19 Follower gear
20 Drive gear (rotating element)
21 Follower gear
22 Shaft (S3, third shaft)
23 Follower gear
24 Follower gear
25 Shaft (S1, first shaft)
26 Synchronizer (second power transmission switching mechanism)
27 Drive gear
28 Sleeve
29 Follower gear
30 Shaft (S2, second shaft)
31 Follower gear
32 Drive gear
33 Differential apparatus
34, 35 Shaft
36, 37 Wheel
40 Engine control device
41 Motor generator control device (electronic control device)
42 Transmission control device (electronic control device)
43 Hybrid control device (electronic control device)
44, 45 Inverter
46 Electrical storage device
47, 48 Actuator

The invention claimed is:

1. A hybrid drive device, comprising:
a gear mechanism formed of a planetary gear mechanism which is disposed between a first motor generator and a second motor generator, and wherein the gear mechanism divides and transmits rotary power from an internal combustion engine to the first motor generator and the second motor generator;
a first shaft positioned relative to the first motor generator so that rotary power from the first motor generator is transmitted to the first shaft;
a rotating element;
a second shaft positioned relative to the rotating element so that rotary power from the rotating element is transmitted to the second shaft;
a third shaft which drives wheels and is positioned relative to the second shaft so that rotary power from the second shaft is transmitted to the third shaft;
a first power transmission switching mechanism that can switch among a state wherein the rotary power from the second motor generator is transmitted to the rotating element, a state wherein transmission to the third shaft is allowed, and a state wherein transmission to the rotating element and to the third shaft is not allowed; and
a second power transmission switching mechanism that can switch between a state wherein transmission of the rotary power from the first shaft to the second shaft is allowed, and a state wherein transmission to the second shaft is not allowed, wherein
the first shaft and the second shaft are coaxially disposed;
the third shaft and the rotating element are coaxially disposed;
the first shaft is disposed on a different axis from the rotating element; and
wherein the planetary gear mechanism comprises:
a sun gear that connects to the first motor generator;
a pinion gear(s) that engages with the sun gear;
a ring gear that engages with the pinion gear(s) and connects to the second motor generator; and
a carrier that rotatably supports the pinion gear(s) and, outputs rotary power from the internal combustion engine to the pinion(s) gears.

2. The hybrid drive device according to claim 1, further comprising:
an electronic control device that controls operations of the internal combustion engine, the first motor generator, the second motor generator, the first power transmission switching mechanism and second power transmission switching mechanism.

3. The hybrid drive device according to claim 2, wherein the electronic control device:
in the first mode, controls the first motor generator so that regeneration by the first motor generator is allowed, controls the second motor generator so that driving by the second motor generator is allowed, controls the first transmission switching mechanism so that transmission of rotary power from the first shaft to the second shaft is not allowed, and controls the second power transmission switching mechanism so that transmission of rotary power from the second motor generator to the rotating element is allowed;
in the second mode that is used when vehicle speed is faster than in the first mode, controls the first motor generator so that driving by the first motor generator is allowed, controls the second motor generator so that regeneration by the second motor generator is allowed, controls the first power transmission switching mechanism so that transmission of rotary power from the first shaft to the second shaft is allowed, and controls the second power transmission switching mechanism so that transmission of rotary power from the second motor generator to the rotating element and the third shaft is not allowed; and
in the third mode that is used when the vehicle speed is faster than in the second mode, controls the first motor generator so that regeneration by the first motor generator is allowed, controls the second motor generator so that driving by the second motor generator is allowed, controls the first power transmission switching mechanism so that the transmission of rotary power from the first shaft to the second shaft is not allowed, and controls that second power transmission switching mechanism so that transmission of rotary power from the second motor generator to the third shaft is allowed.

4. The hybrid drive device according to claim 3, wherein the electronic control device switches the mode among the first mode, second mode and third mode based on a rotational speed of the internal combustion engine and that of the third shaft.

5. The hybrid drive device according to claim 4, wherein the electronic control device, based on the rotational speed of the internal combustion engine and the rotational speed of the third shaft,
performs mode switching from the first mode to the second mode when, during acceleration, the rotational speed of the first shaft matches that of the second shaft; and
performs mode switching from the second mode to the third mode when, during acceleration, the rotational speed of the second motor generator matches that of the third shaft.

6. The hybrid drive device according to claim 2, wherein the hybrid drive device is used in a vehicle;
the vehicle operates at a first speed, a second speed that is faster than the first speed, and a third speed that is faster than the second speed; and the electronic control device has a first mode that is used when the vehicle is in operation at the first speed, and in this first mode, controls the first motor generator so that regeneration by the first motor generator is allowed, controls the second motor generator so that driving by the second motor generator is allowed, controls the first power transmission switching mechanism so that transmission of rotary power from the first shaft to the second shaft is not allowed, and controls the second power transmission switching mechanism so that transmission of rotary power from the second motor generator to the rotating element is allowed.

7. The hybrid drive device according to claim 2, wherein the hybrid drive device is used in a vehicle;

the vehicle operates at a first speed, a second speed that is faster than the first speed, and a third speed that is faster than the second speed; and the electronic control device has a second mode that is used when the vehicle is in operation at the second speed, and in this second mode, controls the first motor generator so that driving by the first motor generator is allowed, controls the second motor generator so that regeneration by the second motor generator is allowed, controls the first power transmission switching mechanism so that transmission of rotary power from the first shaft to the second shaft is allowed, and controls the second power transmission switching mechanism so that transmission of a rotary power from the second motor generator to the rotating element and third shaft is not allowed.

8. The hybrid drive device according to claim 2, wherein the hybrid drive device is used in a vehicle;

the vehicle operates at a first speed, a second speed that is faster than the first speed, and a third speed that is faster than the second speed; and the electronic control device has a third mode that is used when the vehicle is in operation at the third speed, and in this third mode, controls the first motor generator so that regeneration by the first motor generator is allowed, controls the second motor generator so that driving by the second motor generator is allowed, controls the first power transmission switching mechanism so that transmission of rotary power from the first shaft to the second shaft is not allowed, and controls the second power transmission switching mechanism so that transmission of rotary power from the second motor generator to the third shaft is allowed.

9. The hybrid drive device according to claim 7, wherein the first motor generator, the gear mechanism, the second motor generator, the rotating element, the first power transmission switching mechanism and the third shaft are disposed on a first axis in an order from the internal combustion engine side;

the first shaft, the second power transmission switching mechanism and the second shaft are disposed on a second axis in an order from the internal combustion engine side.

10. A hybrid drive device, comprising:

a gear mechanism formed of a single planetary gear mechanism which is disposed between a first motor generator and a second motor generator, and wherein the gear mechanism divides and transmits rotary power from an internal combustion engine to the first motor generator and the second motor generator;

a first shaft positioned relative to the first motor generator so that rotary power from the first motor generator is transmitted to the first shaft;

a rotating element;

a second shaft positioned relative to the rotating element so that rotary power from the rotating element is transmitted to the second shaft;

a third shaft which drives wheels and is positioned relative to the second shaft so that rotary power from the second shaft is transmitted to the third shaft;

a first power transmission switching mechanism that can switch among a state wherein the rotary power from the second motor generator is transmitted to the rotating element, a state wherein transmission to the third shaft is allowed, and a state wherein transmission to the rotating element and to the third shaft is not allowed; and a second power transmission switching mechanism that can switch between a state wherein transmission of the rotary power from the first shaft to the second shaft is allowed, and a state wherein transmission to the second shaft is not allowed, wherein the first shaft and the second shaft are coaxially disposed;

the third shaft and the rotating element are coaxially disposed; and the first shaft is disposed on a different axis from the rotating element.

11. The hybrid drive device according to claim 10, further comprising:

an electronic control device that controls operations of the internal combustion engine, the first motor generator, the second motor generator, the first power transmission switching mechanism and second power transmission switching mechanism.

12. The hybrid drive device according to claim 11, wherein the electronic control device:

in the first mode, controls the first motor generator so that regeneration by the first motor generator is allowed, controls the second motor generator so that driving by the second motor generator is allowed, controls the first transmission switching mechanism so that transmission of rotary power from the first shaft to the second shaft is not allowed, and controls the second power transmission switching mechanism so that transmission of rotary power from the second motor generator to the rotating element is allowed;

in the second mode that is used when vehicle speed is faster than in the first mode, controls the first motor generator so that driving by the first motor generator is allowed, controls the second motor generator so that regeneration by the second motor generator is allowed, controls the first power transmission switching mechanism so that transmission of rotary power from the first shaft to the second shaft is allowed, and controls the second power transmission switching mechanism so that transmission of rotary power from the second motor generator to the rotating element and the third shaft is not allowed; and in the third mode that is used when the vehicle speed is faster than in the second mode, controls the first motor generator so that regeneration by the first motor generator is allowed, controls the second motor generator so that driving by the second motor generator is allowed, controls the first power transmission switching mechanism so that the transmission of rotary power from the first shaft to the second shaft is not allowed, and controls that second power transmission switching mechanism so that transmission of rotary power from the second motor generator to the third shaft is allowed.

13. The hybrid drive device according to claim 12, wherein
the electronic control device switches the mode among the first mode, second mode and third mode based on a rotational speed of the internal combustion engine and that of the third shaft.

14. The hybrid drive device according to claim 13, wherein
the electronic control device, based on the rotational speed of the internal combustion engine and the rotational speed of the third shaft,
performs mode switching from the first mode to the second mode when, during acceleration, the rotational speed of the first shaft matches that of the second shaft; and
performs mode switching from the second mode to the third mode when, during acceleration, the rotational speed of the second motor generator matches that of the third shaft.

15. The hybrid drive device according to claim 11, wherein
the hybrid drive device is used in a vehicle;
the vehicle operates at a first speed, a second speed that is faster than the first speed, and a third speed that is faster than the second speed; and
the electronic control device has a first mode that is used when the vehicle is in operation at the first speed, and in this first mode, controls the first motor generator so that regeneration by the first motor generator is allowed, controls the second motor generator so that driving by the second motor generator is allowed, controls the first power transmission switching mechanism so that transmission of rotary power from the first shaft to the second shaft is not allowed, and controls the second power transmission switching mechanism so that transmission of rotary power from the second motor generator to the rotating element is allowed.

16. The hybrid drive device according to claim 11, wherein
the hybrid drive device is used in a vehicle;
the vehicle operates at a first speed, a second speed that is faster than the first speed, and a third speed that is faster than the second speed; and
the electronic control device has a second mode that is used when the vehicle is in operation at the second speed, and in this second mode, controls the first motor generator so that driving by the first motor generator is allowed, controls the second motor generator so that regeneration by the second motor generator is allowed, controls the first power transmission switching mechanism so that transmission of rotary power from the first shaft to the second shaft is allowed, and controls the second power transmission switching mechanism so that transmission of a rotary power from the second motor generator to the rotating element and third shaft is not allowed.

17. The hybrid drive device according to claim 11, wherein
the hybrid drive device is used in a vehicle;
the vehicle operates at a first speed, a second speed that is faster than the first speed, and a third speed that is faster than the second speed; and
the electronic control device has a third mode that is used when the vehicle is in operation at the third speed, and in this third mode, controls the first motor generator so that regeneration by the first motor generator is allowed, controls the second motor generator so that driving by the second motor generator is allowed, controls the first power transmission switching mechanism so that transmission of rotary power from the first shaft to the second shaft is not allowed, and controls the second power transmission switching mechanism so that transmission of rotary power from the second motor generator to the third shaft is allowed.

18. The hybrid drive device according to claim 16, wherein
the first motor generator, the gear mechanism, the second motor generator, the rotating element, the first power transmission switching mechanism and the third shaft are disposed on a first axis in an order from the internal combustion engine side;
the first shaft, the second power transmission switching mechanism and the second shaft are disposed on a second axis in an order from the internal combustion engine side.

* * * * *